US011930744B2

(12) United States Patent
Jackson et al.

(10) Patent No.: US 11,930,744 B2
(45) Date of Patent: Mar. 19, 2024

(54) SYSTEM AND METHOD OF ADJUSTING IRRIGATION SCHEDULES WITH SOIL MOISTURE DATA

(71) Applicant: The Toro Company, Bloomington, MN (US)

(72) Inventors: Michael Jackson, Bloomington, MN (US); James D. Laiche, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 17/809,801

(22) Filed: Jun. 29, 2022

(65) Prior Publication Data

US 2022/0408665 A1 Dec. 29, 2022

Related U.S. Application Data

(60) Provisional application No. 63/216,451, filed on Jun. 29, 2021.

(51) Int. Cl.
A01G 25/16 (2006.01)

(52) U.S. Cl.
CPC ......... *A01G 25/167* (2013.01); *A01G 25/165* (2013.01)

(58) Field of Classification Search
CPC ..... A01G 25/167; A01G 25/165; Y02A 40/22
See application file for complete search history.

(56) References Cited

U.S. PATENT DOCUMENTS

| | | | | |
|---|---|---|---|---|
| 7,836,910 | B2* | 11/2010 | Dresselhaus | G01N 33/246 137/78.3 |
| 2016/0202679 | A1* | 7/2016 | Bermudez Rodriguez | G05B 19/042 700/284 |
| 2020/0383284 | A1* | 12/2020 | Larsen | G01N 33/246 |

* cited by examiner

*Primary Examiner* — Chad G Erdman
(74) *Attorney, Agent, or Firm* — Inskeep IP Group, Inc.

(57) ABSTRACT

A system and method of irrigation control calculates a predicted soil moisture value based that is compared to low moisture threshold. If the predicted soil moisture value is a value below the low moisture threshold value, the next irrigation cycle or scheduled irrigation operation is allowed to proceed or otherwise activated. The predicted soil moisture value may be calculated by adjusting a current soil moisture value by a historical adjustment factor based on negative net changes in soil moisture values.

15 Claims, 4 Drawing Sheets

SYSTEM AND METHOD OF ADJUSTING IRRIGATION SCHEDULES WITH SOIL MOISTURE DATA

RELATED APPLICATIONS

This application claims benefit of and priority to U.S. Provisional Application Ser. No. 63/216,451 filed Jun. 29, 2021, entitled System And Method Of Adjusting Irrigation Schedules With Soil Moisture Data, which is hereby incorporated herein by reference in its entirety.

BACKGROUND OF THE INVENTION

Sprinkler systems for turf irrigation typically include a plurality of valves and sprinkler heads in fluid communication with a water source, as well as an irrigation controller connected to the water valves. The irrigation controller can be programmed with an irrigation schedule that determines when irrigation should occur, and at the designated times the controller opens the normally closed valves to allow water to flow from the water source to the sprinkler heads, irrigating the nearby turf or plant material.

Some irrigation control systems allow the use of one or more soil moisture sensors to adjust, activate, or suspend an irrigation schedule based on currently sensed soil moisture readings or data.

SUMMARY OF THE INVENTION

In one embodiment, a system and method of irrigation control calculates a predicted soil moisture value based that is compared to low moisture threshold. If the predicted soil moisture value is a value at or below the low moisture threshold value, the next irrigation cycle or scheduled irrigation operation is allowed to procced or otherwise activated. In one example, the predicted soil moisture value may be calculated by adjusting a current soil moisture value by a historical adjustment factor based on negative net changes in soil moisture values.

In one embodiment, the historical adjustment factor includes 1) determining negative net changes to soil moisture values over one or more intervals within a period of time, 2) averaging or determining the median of all negative net changes to soil moisture values, if any or possible, 3) optionally multiplying the averaged or median negative net change value by a predetermined adjustment percentage, and 4) subtracting the averaged or median negative net change value (optionally adjusted) from a current soil moisture value.

One embodiment may include a "low threshold" value that is configured to allow irrigation to commence when a soil moisture reading (e.g., from a soil moisture sensor) is below the low threshold value. This low threshold value may be initially determined or set by the user in the controller or may be pre-set in the controller to a level at which the soil has dried out enough that irrigation is required. While such low threshold values will vary based on the turf/plant types, soil type, and other factors, a typical value may be within a range of 10% to 50% which typically is a volumetric content reading and is determined as a percentage of soil moisture to the solid soil particles and air content within the measured area.

However, instead of using a current soil moisture sensor value, a predicted soil moisture sensor value may be determined and used to compare with the low threshold value. This predicted soil moisture sensor value may prevent the actual soil moisture value from descending too far below the low threshold before allowing the next irrigation cycle to begin, as might sometimes otherwise occur with only a current soil moisture value. Hence, when the predicted soil moisture value is below the low threshold value, the next irrigation cycle may be activated for irrigation (or not deferred/canceled), where it might not otherwise have been activated. Hence, the predicted soil moisture sensor value may prevent the soil moisture level from dropping below the set low threshold value determined by the user or otherwise by the controller.

The irrigation system of the present invention may include either a central irrigation controller or a dedicated, stand-alone irrigation controller. Central irrigation controllers typically take the form of a personal computer (and/or a cloud-based server) that executes irrigation control software. The computer is connected to other irrigation control equipment, such as decoders, satellite controllers, valves, sensors, and other equipment to control when irrigation in areas of turf occur. Dedicated, stand-alone irrigation controllers are typically configured for direct connection and control of irrigation valves and equipment in the field, and therefore often are configured for a smaller number of irrigation valves. When irrigation valves are open, the cause irrigation from one or more sprinklers (or similar devices) which direct the water to a designated area of soil/plants/turf.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION

Figure 1:
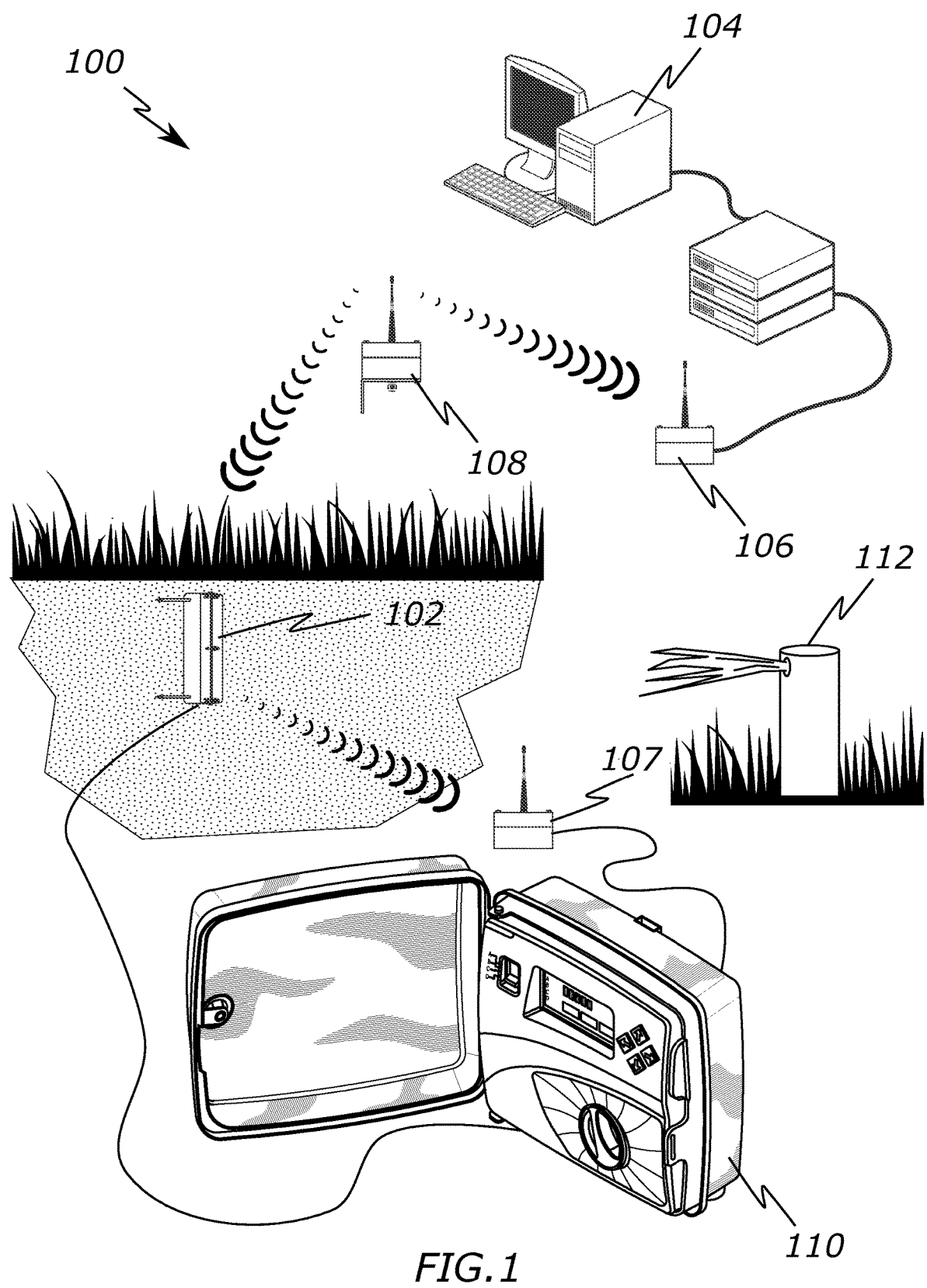
FIG. 1 is an illustration of an irrigation system.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements. While different embodiments are described, features of each embodiment can be used interchangeably with other described embodiments. In other words, any of the features of each of the embodiments can be mixed and matched with each other, and embodiments should not necessarily be rigidly interpreted to only include the features shown or described.

Some irrigation control systems allow the use of one or more soil moisture sensors to adjust, activate, or suspend an irrigation schedule based on currently sensed soil moisture readings or data. These systems typically use this soil moisture data according to one of several methods.

In a first example, an irrigation controller is configured to cause irrigation to commence when a soil moisture reading is below a user-set "low threshold" value. This low threshold value is typically set to a soil moisture level at which the soil has dried out enough that irrigation is again required.

In another example, an irrigation controller allows a user to program a "high threshold" soil moisture threshold which terminates irrigation when a soil moisture level is exceeded. The high threshold is typically set to a soil moisture level at which the turf is sufficiently wet and further watering is unnecessary or harmful.

In a third example, an irrigation controller uses both the low threshold and the high threshold values to control the irrigation schedule. In this method, irrigation schedules are set to operate every day of the week or as many days as possible but only commences on the scheduled days where the soil moisture is below the low threshold. Irrigation according to the schedule continues until either the schedule irrigation times finishes, or the current irrigation event surpasses high threshold. Typically, these low threshold and high threshold values are set to static or unchanging values unless the user intervenes and manually adjusts it.

When using any adjustment method that partially or fully relies on the low threshold soil moisture scheduling, there is a risk of having the moisture descend too far below low threshold before the next irrigation event of the irrigation schedule is scheduled to begin. For example, under certain environmental conditions, the soil moisture value may end slightly above the set low threshold value for that day, therefore preventing the scheduled irrigation event from starting that day. If the next day experiences extreme heat, wind, and/or drought, the moisture value may drop too far below the low threshold for the scheduled irrigation to replace enough of the water to reach the high threshold and therefore damage may occur to plant material. In other words, some circumstances can cause the soil moisture level to drop too far before the next scheduled irrigation event of the irrigation schedule.

These occurrences of the soil moisture level falling too far below the low threshold might otherwise be unlikely to occur if an irrigation controller had the ability to start irrigation at any time of the day or night. However, most users restrict irrigation to the evening or early morning hours when the turf is not generally in use by people and less evaporation of the irrigated water occurs. Hence, these "gaps" in when irrigation may occur can result in an imbalance in irrigation, depending on the weather. The present invention is generally directed to systems, methods, devices, and/or algorithms that help prevent a soil moisture level from dropping too far due to these gaps.

The present invention is directed to both a method of controlling irrigation and a system of controlling irrigation. Generally, both include an irrigation controller and a soil moisture sensor that is configured to relay a soil moisture value to the irrigation controller. In that respect, the soil moisture sensor is typically positioned within the area of turf that is configured to be irrigated (i.e., with sprinklers or other watering implements installed). Additionally, the methods discussed herein can be embodied in computer code stored in a non-transitory computer-readable media, such as an electronic memory or storage device, and can be executed with a computer processor. The computer processor executing the computer code may be located within a stand-alone irrigation controller, a satellite irrigation controller, a device connected to an irrigation controller (e.g., a device configured to interrupt irrigation from an irrigation controller), a personal computer, one or more cloud servers, or similar devices. Any of these device may include electronics configured to control irrigation valves, and thereby irrigation, either within the housing of their devices or as separate devices.

FIG. 1 illustrates one example irrigation system 100 that can be used according to the present invention. The irrigation system 100 can include either a central irrigation controller 104 or a dedicated, stand-alone irrigation controller 110. Central irrigation controllers 104 typically take the form of a personal computer that executes irrigation control software. The computer is connected to other irrigation control equipment, such as decoders, satellite controllers, valves, sensors, and other equipment to control when irrigation in areas of turf occur. Dedicated, stand-alone irrigation controllers 110 are typically configured for direct connection and control of irrigation valves and equipment in the field, and therefore often are configured for a smaller number of irrigation valves. When irrigation valves are open, the cause irrigation from one or more sprinklers 112 (or similar devices) which direct the water to a designated area of soil/plants/turf.

A soil moisture sensor 102 is typically buried in or near the area of plant material in which irrigation is being controlled by the irrigation controller. Some soil moisture sensors are directly wired to a controller 110 or other equipment (e.g., central controller equipment), while other soil moisture sensors are configured to wirelessly relay soil moisture data to a wireless receiver 107 connected or part of the controller 110, or to a base station 106 (optionally via repeaters 108) connected to the central controller 104. In this manner, soil moisture data or readings can be sent to or obtained by the controller when requested by the controller or at regular intervals.

The present invention is generally directed to a system and method of irrigation control that includes a "low threshold" value that is configured to allow irrigation to commence when a soil moisture reading (e.g., from a soil moisture sensor 102) is below the low threshold value. This low threshold value may be initially determined or set by the user in the controller or may be pre-set in the controller to a level at which the soil has dried out enough that irrigation is required. While such low threshold values will vary based on the turf/plant types, soil type, and other factors, a typical value may be within a range of 10% to 50% which typically is a volumetric content reading and is determined as a percentage of soil moisture to the solid soil particles and air content within the measured area.

However, instead of using a current soil moisture sensor value, a predicted soil moisture sensor value may be determined and used to compare with the low threshold value. This predicted soil moisture sensor value may prevent the actual soil moisture value from descending too far below the low threshold before allowing the next irrigation cycle to begin, as might sometimes otherwise occur with only a current soil moisture value. Hence, when the predicted soil moisture value is below the low threshold value, the next irrigation cycle may be activated for irrigation (or not deferred/canceled), where it might not otherwise have been activated. Hence, the predicted soil moisture sensor value may prevent the soil moisture level from dropping below the set low threshold value determined by the user or otherwise by the controller.

Another way to consider this is that this predicted low threshold value creates a "safety zone" that extends several percentage points above the set low threshold value when soil moisture values trend downward over a period of time. Hence, when the measured moisture content is within this safety zone, the next irrigation cycle may be activated for irrigation (or not deferred/canceled).

Figure 4:
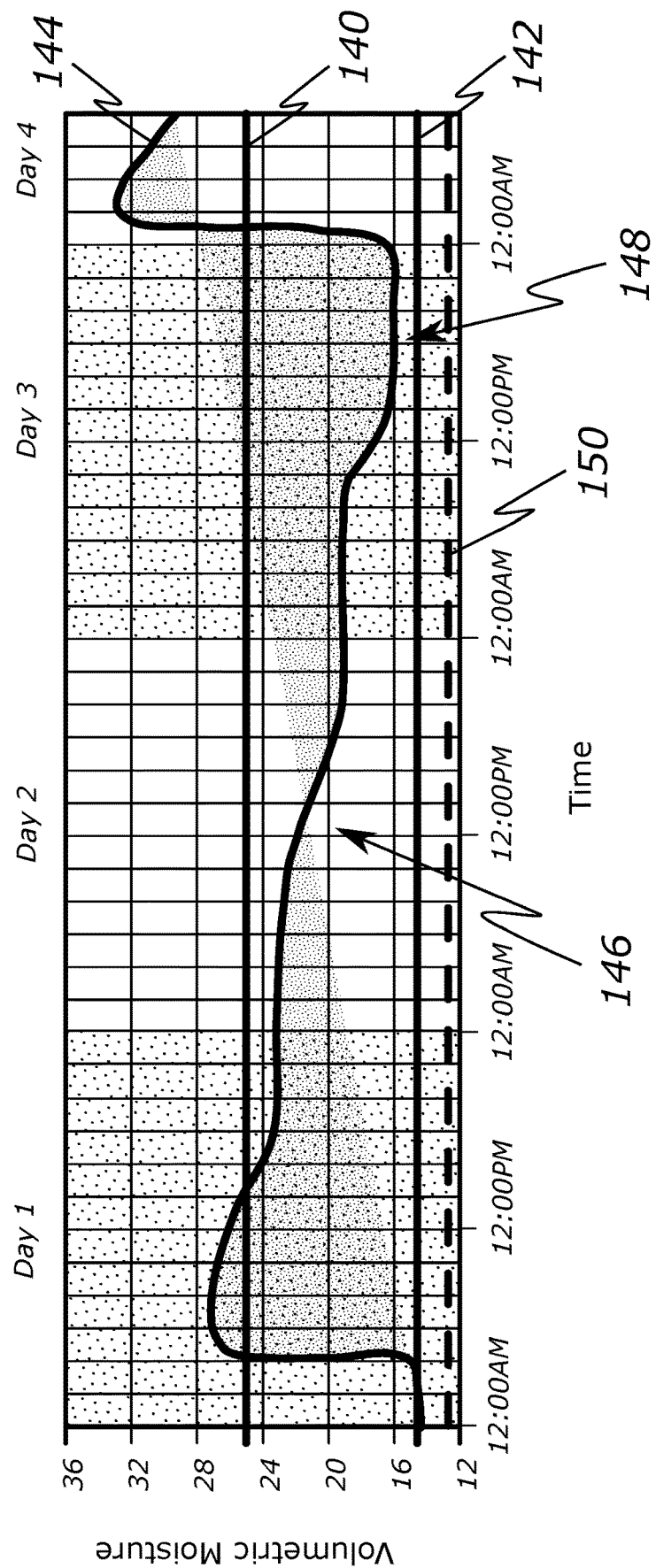
FIG. 4 is an example soil moisture data graph.

This method is best visualized in FIG. 4, which illustrates a graph of volumetric moisture values over several days of time. Line 144 represents measured soil moisture sensor values and line 142 represents a set low threshold value. As noted with element 146, the measured soil moisture sensor values trend downward over days 1-3. As discussed further below, this data can be used to calculate a predicted soil moisture value 150. In the present example, the predicted soil moisture value 150 is below the low threshold value 142, and therefore the next irrigation cycle is allowed to irrigate (or not prevented from irrigation).

Optionally, the method may also include a "high threshold" value 140 that prevents irrigation above a predetermined value, however this data is not necessarily included in calculating the predicted soil moisture sensor value. The high threshold value 140 may be initially determined by the user or pre-set in the controller to a level at which the plant material is sufficiently wet and further watering is unnecessary or harmful. While such high threshold values will vary based on the turf/plant types, soil types, and other factors, a typical value may be in the range of 20% to 70% volumetric content reading.

As discussed above, high threshold and low threshold values for soil moisture in current irrigation controllers are typically static, changing only when manually adjusted by the user. In contrast, the present method and system dynamically adjusts the low threshold value based on prior soil moisture sensor values.

Figure 2:
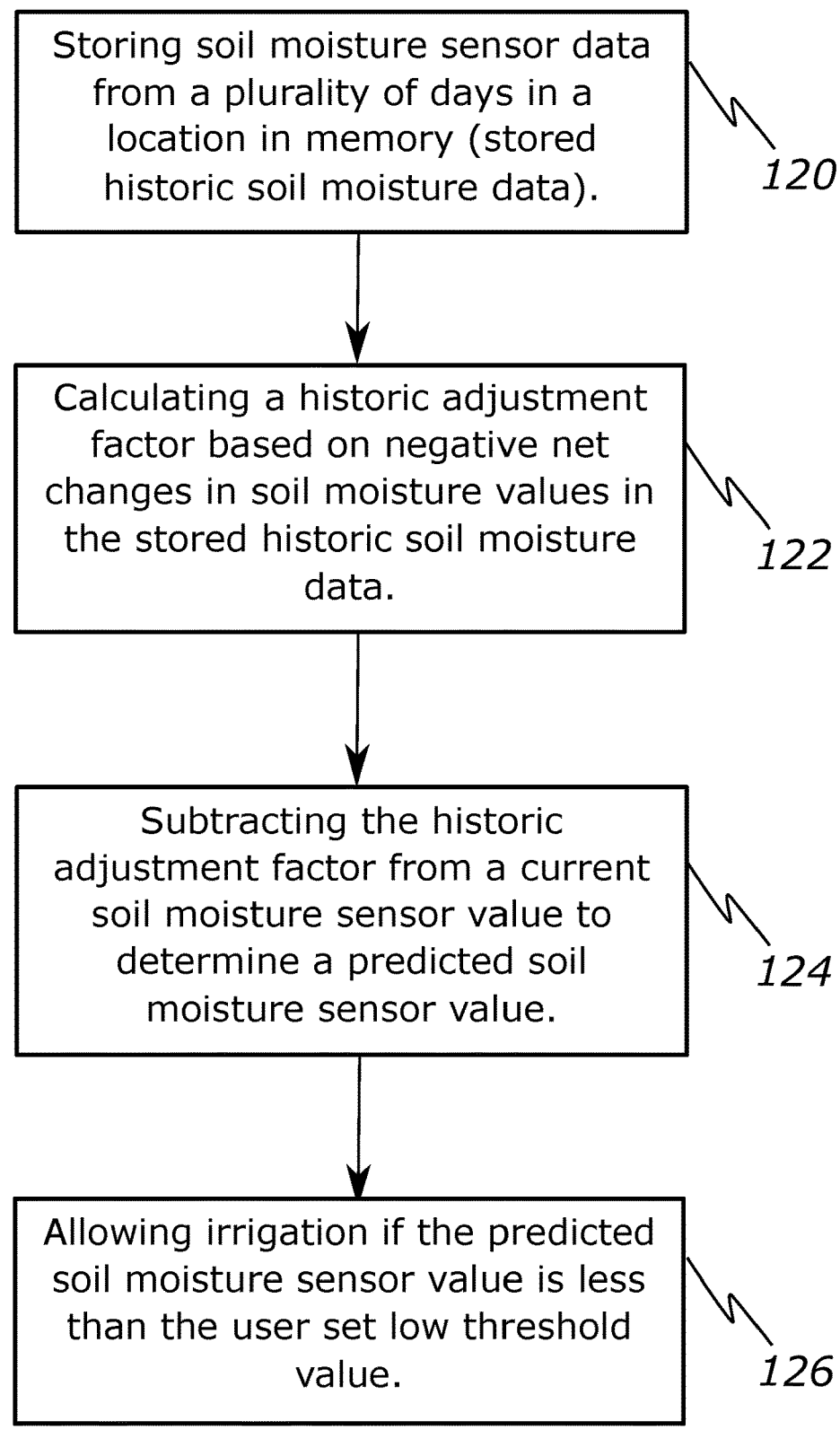
FIG. 2 is a flow chart of an irrigation adjustment method.

In one example seen in FIG. 2, this dynamic adjustment is performed by 1) storing soil moisture sensor data from a plurality of days for a location in memory (stored historic soil moisture data) in step 120, 2) calculating a historic adjustment factor based on negative net changes in soil moisture values in the stored historic soil moisture data in step 122, 3) subtracting the historic adjustment factor from a current soil moisture sensor value to determine a predicted soil moisture sensor value in step 124, and 4) allowing irrigation if the predicted soil moisture sensor value is less than the user/controller set low threshold value in step 126 (or alternately preventing an irrigation schedule's execution). Each of these steps and variations are discussed further below.

Turning to step 120, historic soil moisture data is created by periodically storing soil moisture sensor data. For example, soil moisture sensor data can be stored in continuous 5, 10, 20, 30, or 60 minute intervals. This data can be stored in a number of different locations, such as within the memory of a stand-alone irrigation controller, the memory of a central controller (e.g., a PC hard drive), or in the memory of a remote cloud server that can be accessed by an irrigation controller.

Again, this soil moisture sensor data is received from a soil moisture sensor 102 installed in the soil of an irrigation site that is being controlled. While a single soil moisture sensor 102 can be used for an entire irrigation site, a plurality of sensors 102 may also be used for different locations or zones of the irrigation site. Hence, the present methods and systems can be applied on a zone-by-zone basis with a plurality of soil moisture sensors 102. Additionally or alternately, multiple soil moisture sensors 102 may be used for a single zone and their data averaged or otherwise merged together.

Turning to steps 122 and 124, a historic adjustment factor is calculated and compared to a current soil moisture sensor value/reading (i.e., the current moisture value sent from a soil moisture sensor 102 in a particular irrigation site or zone). This historic adjustment factor is used to adjust the current soil moisture sensor value and results in the predicted soil moisture value which may then be compared to set low threshold value.

The historic adjustment factor can be determined in a variety of different ways but may be generally based on the negative net changes in soil moisture values over a predetermined amount of time.

Figure 3:
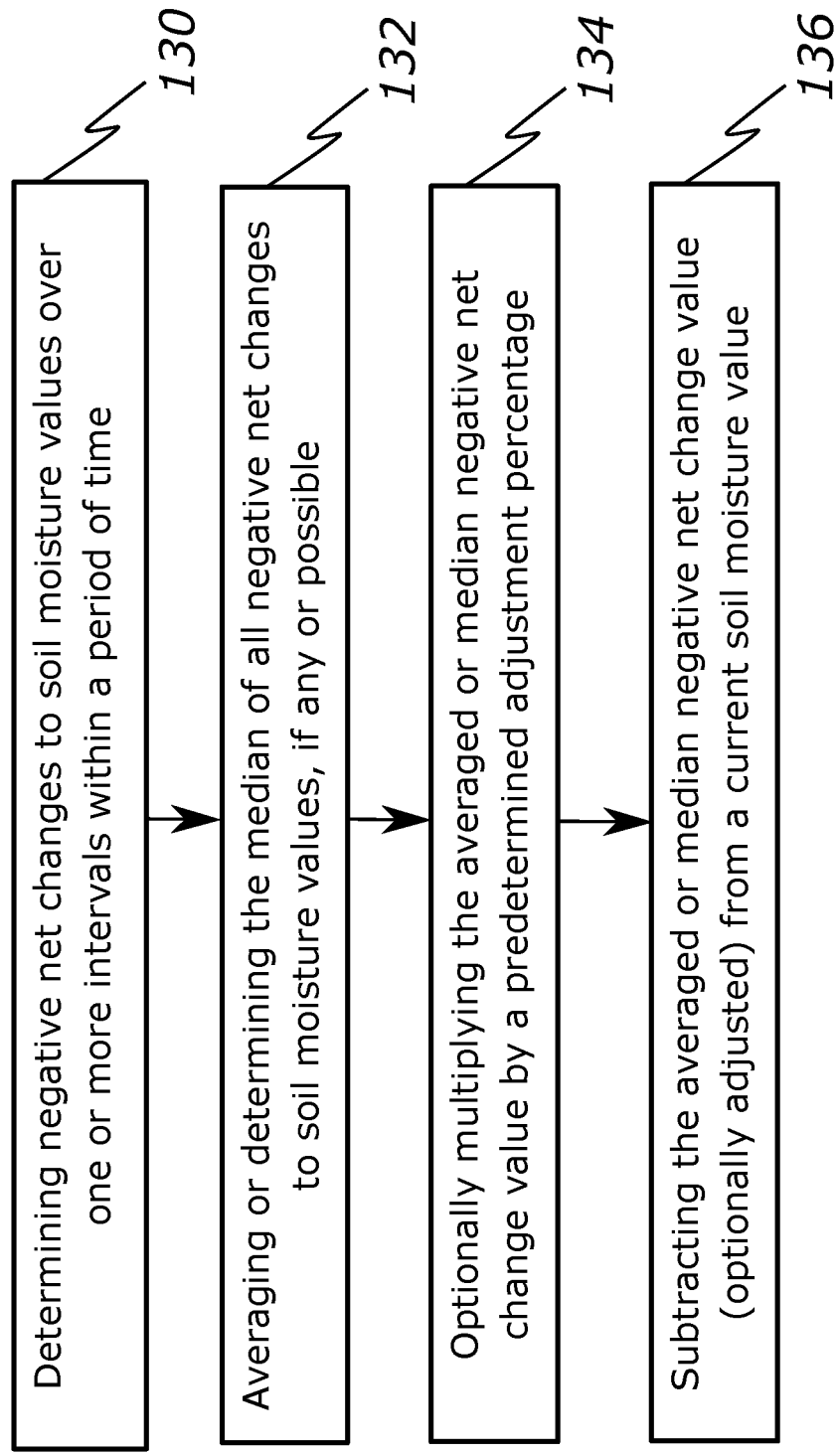
FIG. 3 is a flow chart of an irrigation adjustment method.

In one example seen in FIG. 3, the negative net changes in soil moisture values can be determined by calculating net changes in soil moisture for each of a plurality of intervals over a period of time from the historic soil moisture data (step 130). Each interval can be 12 hours, 24 hours, 36 hours, 48 hours, or similar increments of time. Each period of time can be from 1 to 14 days in the past (e.g., 2, 3, 4, 5, or 6 24-hour days). Depending on the period of time and interval size, different numbers of net change values will be determined. For example, a 3-day period of 24 hour intervals will result in 3 net change values. In some cases, an interval may be the same size as the period of time (i.e., one calculation is made for a single period of time, such as 3 days). A period of about 3 days with about 24 hour intervals may be particularly beneficial for this calculation for providing a desirable amount of accuracy and safety.

Intervals with zero or positive net change values for soil moisture may not be used further in the calculation, though could be factored into other calculations or adjustments. Intervals with negative net change values for soil moisture are used in further calculations as described below. This may help focus the historical adjustment factor on the rate of moisture depletion only.

If no intervals have negative net changes (i.e., there have only been positive net changes in soil moisture), the low threshold adjustment factor is 0 and therefore there will be no change to the current soil moisture sensor value as it is compared to the low threshold. In other words, the predicted soil moisture value will be that of the current/measured soil moisture value.

Next, in step 132, the intervals with negative net changes are averaged (or alternately the median determined) to produce a single negative net change value (unless only a single negative net change value was initial determined and therefore this averaging can be skipped).

Optionally, this averaged (or median) negative net change value may be further adjusted or reduced by a predetermined percentage to reduce dramatic changes that relatively short and dramatic weather changes might otherwise impart. In other words, the averaged negative net change can be multiplied by a percentage between 1% and 100% so that whatever the average negative net change has been over a period of time, this percentage will reduce that number. In one example, the percentage is 75%, 50%, or 25%, though any percentage can be used. In some climates with long and/or dramatic weather changes, it may alternately be desirable to multiply the averaged negative net change by a percentage above 100%.

The predetermined percentage may be pre-set by the manufacturer of the irrigation controller, set by the user, or adjusted based on one or more other factors (e.g., geographic location, time of year, weather forecasts, etc.). Once the averaged (or median) negative net change value is multiplied by the adjustment percent, the historic adjustment factor is determined.

Finally, in step 136, the historic adjustment factor is subtracted or otherwise removed from a current soil moisture sensor value (or a moisture value from very close in time, e.g., 10-60 minutes) to result in a predicted soil moisture sensor value. While this step is illustrated as subtraction, other calculations may be used to achieve similar results. For example, the historic adjustment factor may be further calculated as a percentage that is then multiplied by the current soil moisture sensor.

Finally, in step 126 of FIG. 2, the predicted soil moisture value is compared to the user-determined low threshold. If the predicted soil moisture value is less than the low threshold, irrigation according to the irrigation schedule is allowed to proceed. If the predicted soil moisture value is above the low threshold, irrigation according to the irrigation schedule is halted or prevented from occurring.

The method described above may also be represented with the following formulas, though it should be understood that different calculation methods are possible to achieve the same or similar results:

The historic adjustment factor=(the average/median negative net changes of one or more historic time intervals)×(the predetermined percentage)

The predicted soil moisture value=(the current soil moisture value)−(the historic adjustment factor)

In one specific example, the method above is performed with negative net changes over a three-day period, with 24-hour intervals, and with a 50% predetermined percentage adjustment.

In another specific example, the method above is performed with negative net changes over a four-day period, with 24-hour intervals, and with a 50% predetermined percentage adjustment.

In another specific example, the method above is performed with negative net changes over a two-day period, with 24-hour intervals, and with a 50% predetermined percentage adjustment.

In another specific example, the method above is performed with negative net changes over a three-day period, with 24-hour intervals, and with a predetermined percentage adjustment in the range of 25% to 75%.

In another specific example, the method above is performed with negative net changes over a three-day period, with 24-hour intervals, and with a predetermined percentage adjustment in the range of 40% to 60%.

In another specific example, the method above is performed with negative net changes over a three-day period, with 24-hour intervals, and with a predetermined percentage adjustment in the range of 25% to 75%.

While the above method and system have been described in terms of creating a predicted soil moisture sensor value that is compared against a user-determined low threshold, it should be understood that a similar calculation can be used to instead adjust the level of the low threshold by a similar amount and therefore compare that adjusted low threshold to a current soil moisture value to achieve a similar result.

While a single irrigation controller of different types is discussed in this specification, it should be understood that multiple computers and/or devices can be used together to control irrigation. Hence, the term irrigation controller should not necessarily be strictly construed to only a single device.

Any of the embodiments of this specification may also include a software/method that causes the application of water at the exact amount to reach a preset high moisture level threshold. This may be achieved by setting up irrigation cycles to repeat and apply water in shorter increments. Alternately, the software may be configured to detect ascending moisture levels during irrigation and then automatically adjust the application of the water to just reach the high moisture level threshold value and not over-shoot it.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation control system, comprising:
an irrigation controller configured to:
calculate a predicted soil moisture value based on historic moisture sensor values for an area of soil;
compare the predicted soil moisture value with a predetermined low moisture value threshold; and,
if the predicted soil moisture value is below the predetermined low moisture value threshold, allow a next scheduled irrigation cycle for the area of soil to operate and cause irrigation of the area of soil;
wherein the predicted soil moisture value is calculated by adjusting a current soil moisture value by a historical adjustment factor; wherein the historical adjustment factor is calculated by:
a) determining negative net changes to the historic soil moisture values over one or more intervals within a period of time;
b) averaging or determining a median of all negative net changes to the historic soil moisture values;
c) subtracting the averaged or median negative net change value of one or more intervals from the current soil moisture value.

2. The irrigation control system of claim 1, wherein the step of averaging or determining the median of all negative net changes to the historic soil moisture values is followed by multiplying the averaged or median negative net change value by a predetermined adjustment percentage.

3. The irrigation control system of claim 2, wherein the historic soil moisture values comprise three 24 hour intervals.

4. The irrigation control system of claim 2, wherein the historic soil moisture values comprise 12 hours, 24 hours, 36 hours, or 48 hour intervals, and wherein the historic soil moisture values comprise 2, 3, 4, 5, or 6 intervals.

5. The irrigation control system of claim 2, wherein the predetermined adjustment percentage is between 1% and 100%.

6. The irrigation control system of claim 2, wherein the historic soil moisture values comprise three intervals of 24-hours, and wherein the predetermined adjustment percentage is 50%.

7. The irrigation control system of claim 2, wherein the historic soil moisture values comprise three intervals of 24-hours, and wherein the predetermined adjustment percentage is within a range of 25% to 75%.

8. The irrigation control system of claim 1, further comprising a soil moisture sensor in communication with the irrigation controller, and wherein the irrigation controller is configured to store moisture sensor data from the soil moisture sensor.

9. A method of irrigation control, comprising:
receiving and electronically storing soil moisture sensor data from a soil moisture sensor located in an area of soil;

calculating a predicted soil moisture value based on the stored soil moisture sensor data;

comparing the predicted soil moisture value with a predetermined low moisture value threshold; and, if the predicted soil moisture value is below the predetermined low moisture value threshold, allowing a next scheduled irrigation cycle of an irrigation controller for the area of soil to operate and cause irrigation of the area of soil; wherein the predicted soil moisture value is calculated by adjusting a current soil moisture value by a historical adjustment factor; wherein the historical adjustment factor is calculated by:
  a) determining negative net changes to the stored soil moisture values over one or more intervals within a period of time;
  b) averaging or determining a median of all negative net changes to one or more intervals of the stored soil moisture values;
  c) subtracting the averaged or median negative net change value from the current soil moisture value.

10. The method of claim 9, wherein the step of averaging or determining the median of all negative net changes to the one or more intervals of the stored soil moisture values is followed by multiplying the averaged or median negative net change value by a predetermined adjustment percentage.

11. The method of claim 10, wherein the stored soil moisture values comprise three 24 hour intervals.

12. The method of claim 10, wherein the stored soil moisture values comprise 12 hours, 24 hours, 36 hours, or 48 hour intervals, and wherein the stored soil moisture values comprise 2, 3, 4, 5, or 6 intervals.

13. The method of claim 10, wherein the predetermined adjustment percentage is between 1% and 100%.

14. The method of claim 10, wherein the stored soil moisture values comprise three intervals of 24-hours, and wherein the predetermined adjustment percentage is 50%.

15. An irrigation controller, comprising:
  a processor, memory, and electronics configured to control irrigation valves; the irrigation controller comprising software executable with the processor and configured to:
    calculate a predicted soil moisture value based on historic moisture sensor values for an area of soil;
    compare the predicted soil moisture value with a predetermined low moisture value threshold; and,
    if the predicted soil moisture value is below the predetermined low moisture value threshold, allow a next scheduled irrigation cycle for the area of soil to operate and cause irrigation of the area of soil;
    wherein the predicted soil moisture value is calculated by adjusting a current soil moisture value by a historical adjustment factor; wherein the historical adjustment factor is calculated by:
      a) determining negative net changes to the historic soil moisture values over one or more intervals within a period of time;
      b) averaging or determining a median of all negative net changes to the historic soil moisture values;
      c) subtracting the averaged or median negative net change value of one or more intervals from the current soil moisture value.

* * * * *